United States Patent [19]

Rose

[11] Patent Number: 4,563,144

[45] Date of Patent: Jan. 7, 1986

[54] HYDRAULIC BLOCK PRESS

[76] Inventor: Andrew F. Rose, P.O. Box 325, Greeley, Colo. 80632

[21] Appl. No.: 693,610

[22] Filed: Jan. 22, 1985

[51] Int. Cl.[4] .................................................. B29C 3/06

[52] U.S. Cl. ...................................... 425/166; 425/146; 425/167; 425/256; 425/258; 425/260

[58] Field of Search ............... 425/139, 146, 253, 167, 425/256, 258, 260, 166

[56] References Cited

U.S. PATENT DOCUMENTS

| | | | |
|---|---|---|---|
| 2,888,731 | 6/1959 | McElroy et al. | 425/167 X |
| 3,107,410 | 10/1963 | Davis | 425/167 X |
| 3,331,112 | 7/1967 | Clanton et al. | 425/253 X |
| 3,368,254 | 2/1968 | Schacht | 425/167 |
| 3,397,435 | 8/1968 | Jeleslewicz | 425/258 X |
| 3,730,659 | 5/1973 | Smith et al. | 425/258 X |
| 3,767,351 | 10/1973 | Blaser | 425/167 X |
| 3,802,820 | 4/1974 | Iwasaki | 425/167 |
| 3,806,297 | 4/1974 | Scales | 425/253 |
| 3,811,808 | 5/1974 | Platt | 425/167 |
| 3,989,432 | 11/1976 | Depka | 425/139 |
| 4,439,129 | 3/1984 | Long et al. | 425/167 X |

*Primary Examiner*—J. Howard Flint, Jr.

[57] ABSTRACT

A hydraulic press for non-refractory material consisting of a rigid framework and a vertically moveable press pad and horizontally moveable box section. A mold cavity is defined within framework and the press pad is contained within. Moveable box section delivers stock to mold cavity, forms cover over mold cavity during manufacture, and ejects formed unit from framework. A hydraulic cylinder is provided for movement of press pad during compression of unit and to raise unit for ejection from framework. A separate hydraulic cylinder is provided for movement of box section through framework. Both cylinders are fixedly connected to the framework. Hydraulic fluid, directed by solenoid-activated valves, provides movement of cylinders. Control means include an electrical circuit using relays, timmer, pressure actuated valve, and mechanical trip switches.

5 Claims, 12 Drawing Figures

HYDRAULIC BLOCK PRESS

FIELD OF THE INVENTION

The present invention relates to presses of the type used in compressing material such as are used in making brick. More specifically it relates to hydraulic presses used in the manufacture of non-refractory brick.

BACKGROUND OF THE INVENTION

Prior art hydraulic presses commonly include a plane table with means to supply stock to a female mold with or without electrical control or power means. An example of a typical prior art brick press is illustrated in the Platt U.S. Pat. No. 3,811,808. Such presses commonly rely upon two diametrically opposed press members during the molding operation. It is common that hydraulic cylinders which control positioning of press members are actuated by manual control. This leads to difficulty in positioning and synchronization of press members. Correct positioning of machine elements is one area lacking in prior art. A common arrangement in prior art presses is to form a unit of regulated or predetermined volume. Often this results in units of varying density or consistency. The described invention eliminates this problem. Other objects and further features and advantages of the invention will become apparent following a study of the detailed description with reference to the drawings.

SUMMARY OF THE INVENTION

The present invention includes an improved hydraulic press for non-refractory materials. Press components are hydraulically controlled and operated by electrical circuitry. A press pad and box section are fixedly supported by a framework. One vertically extended mold cavity supports the lower plunger assembly and press pad. Means are provided for selective vertical movement of the press pad with respect to the box section. The framework includes a pair of spaced-apart vertical side members, a crown, a lower support bracket for hydraulic cylinder, and two side plates forming a mold cavity. One of the particular features embodying this invention is the box section for delivery of stock. The box section delivers stock to the mold cavity and then forms a cover over mold cavity during compression of the brick material. The compressive forces are transfered through the box section to the framework. Said box section also ejects formed units from the framework while delivering a new load of stock to the mold cavity. Another feature of the hydraulic press apparatus embodying the invention is a pressure-actuated switch on lower plunger assembly so that units are formed to a consistent pressure. This permits greater quality control in the finished product. A principal feature of the hydraulic press apparatus embodying the invention is that electrical circuitry in combination with elements allows operation without operator assistance. This permits precise positioning and high speed operation. The lower plunger assembly completes two vertical movements during production of each brick: It compresses the brick unit, then retracts to reduce high forces through box section, then raises unit above mold cavity, and then retracts to accept a new load in the mold cavity. Another advantage of the apparatus of the invention is that press can be constructed on a mobile unit, a truck, or trailer. This allows for use at various locations. Other features of the invention will be apparent from the description of the embodiments of the invention, from the claims, and from the drawings.

DESCRIPTION OF THE PREFERRED EMBODIMENTS

Figure 2:
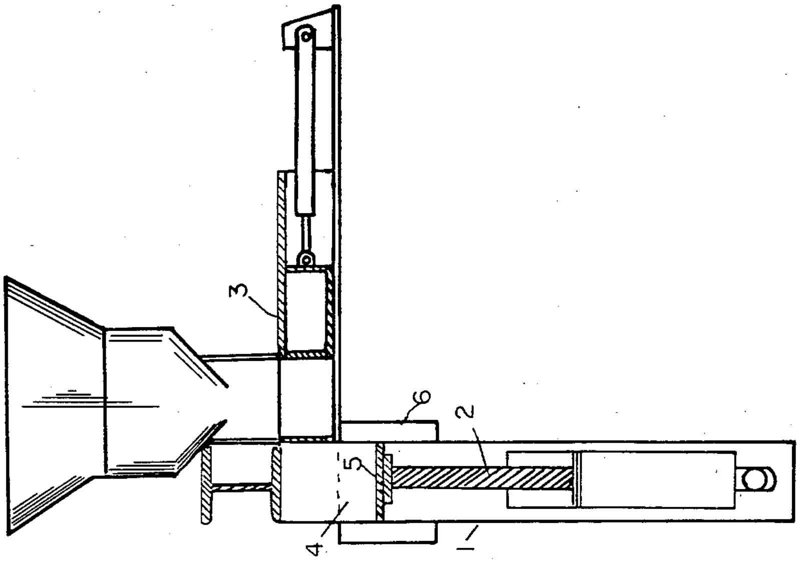
FIG. 2 is a side elevation, in section, of a hydraulic press embodying the invention.
Figure 1:
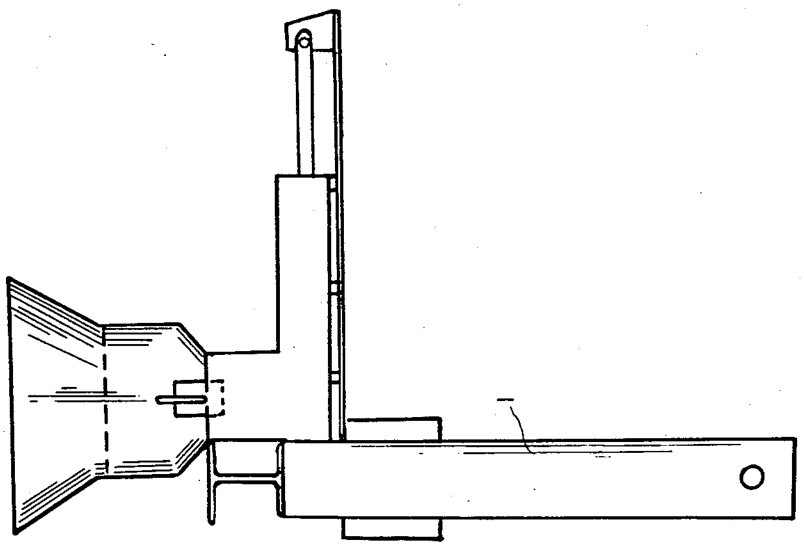
FIG. 1 is a side elevation view of a hydraulic press embodying the invention.
Figure 5:
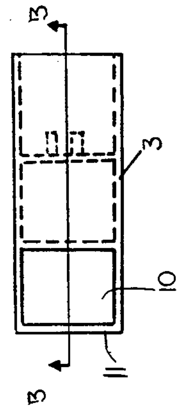
FIG. 5 is a top view of a box section embodying the invention.
Figure 6:
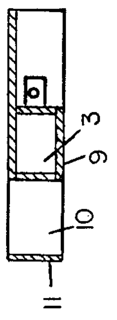
FIG. 6 taken from section B—B in FIG. 5 is a side elevation view of box section.
Figure 4:
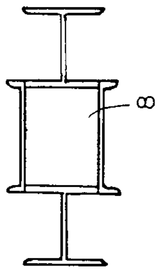
FIG. 4 taken from section A—A in FIG. 3 shows members defining mold cavity.
Figure 3:
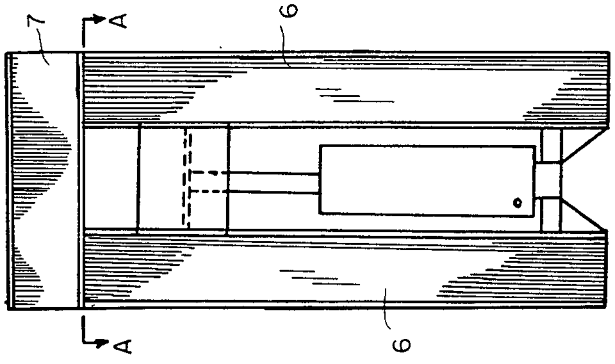
FIG. 3 is a front elevation view of the press shown in FIG. 1 and FIG. 2.
Figure 7:
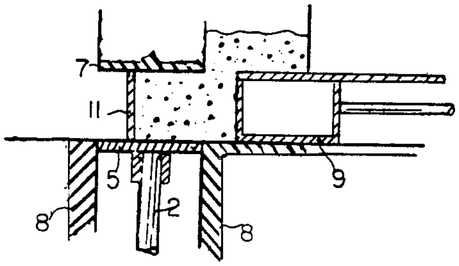
FIGS. 7, 8, 9, 10 are side sectional views of press apparatus in operation.
Figure 8:
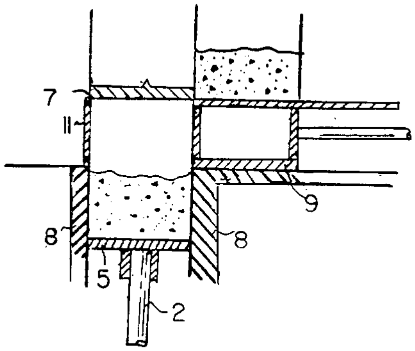
Figure 9:
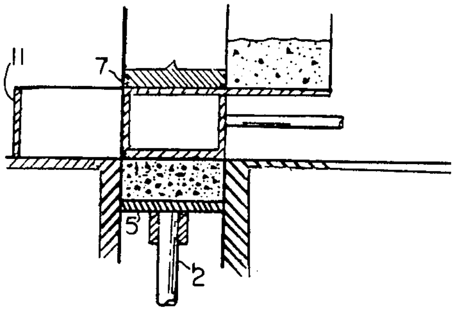
Figure 10:
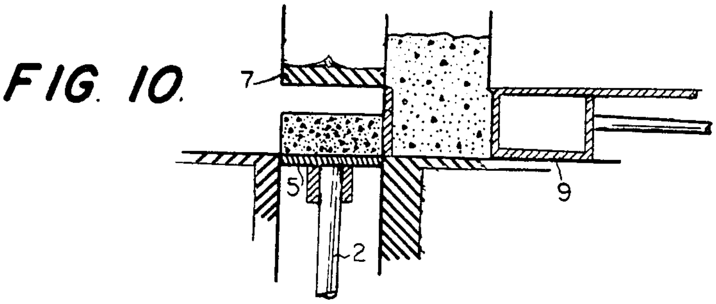
Figure 11:
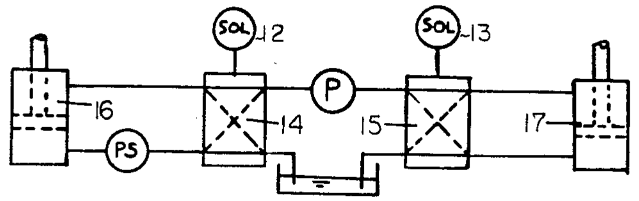
FIG. 11 is a hydraulic schematic diagram showing two solenoids and valves.

Preferred embodiments of the invention will now be described while referring to the accompanying drawings. The hydraulic press which is illustrated in FIG. 1 and FIG. 2 includes a framework 1, a hydraulic ram 2, and a moveable box section 3. A uniform volume of supply stock is transported by moveable box section 3 to the mold cavity 4 for compression by press pad 5. FIG. 3 shows a press apparatus embodying the invention, having a frame 1 consisting of a pair of vertical side members 6 supporting a crown member 7. Section A—A, shown as FIG. 4, shows an additional pair of side members 8 forming with the pair of side members 6 the mold cavity 4. The supply stock deposited in mold cavity 4 is contained within a controlled area and is pressed to uniform pressures. FIG. 5 and FIG. 6 (Sec. B—B) are drawings of the moveable box section 3 incorporating several embodiments. The box section 3 transports a predetermined volume of stock to mold cavity 4, ejects the compressed unit from framework 1, and provides an upper bearing surface 9 during compression of the unit. The box section 3 contains a cavity 10 without cover on top and bottom. Said cavity 10, of predetermined size, transports stock above mold cavity 4. A front plate 11 acts as a bearing surface to eject compressed unit. Box section 3, when positioned with bearing surface 9 above mold cavity 4, transfers compressive forces to the crown 7 and vertical side members 6 when the press pad 5 moves upwardly to compress the stock in the mold cavity. FIGS. 7, 8, 9, and 10 show the sequence operation. Means are provided for selective vertical positioning of press pad 5 and synchronous horizontal positioning of box section 3. FIG. 11 is a hydraulic schematic diagram showing two solenoids 12 and 13 and valves 14 and 15 for actuation of cylinders 16 and 17 which provide movements to press pad 5 and box section 3. Additional elements shown on FIG. 11 are prior art applications.

Figure 12:
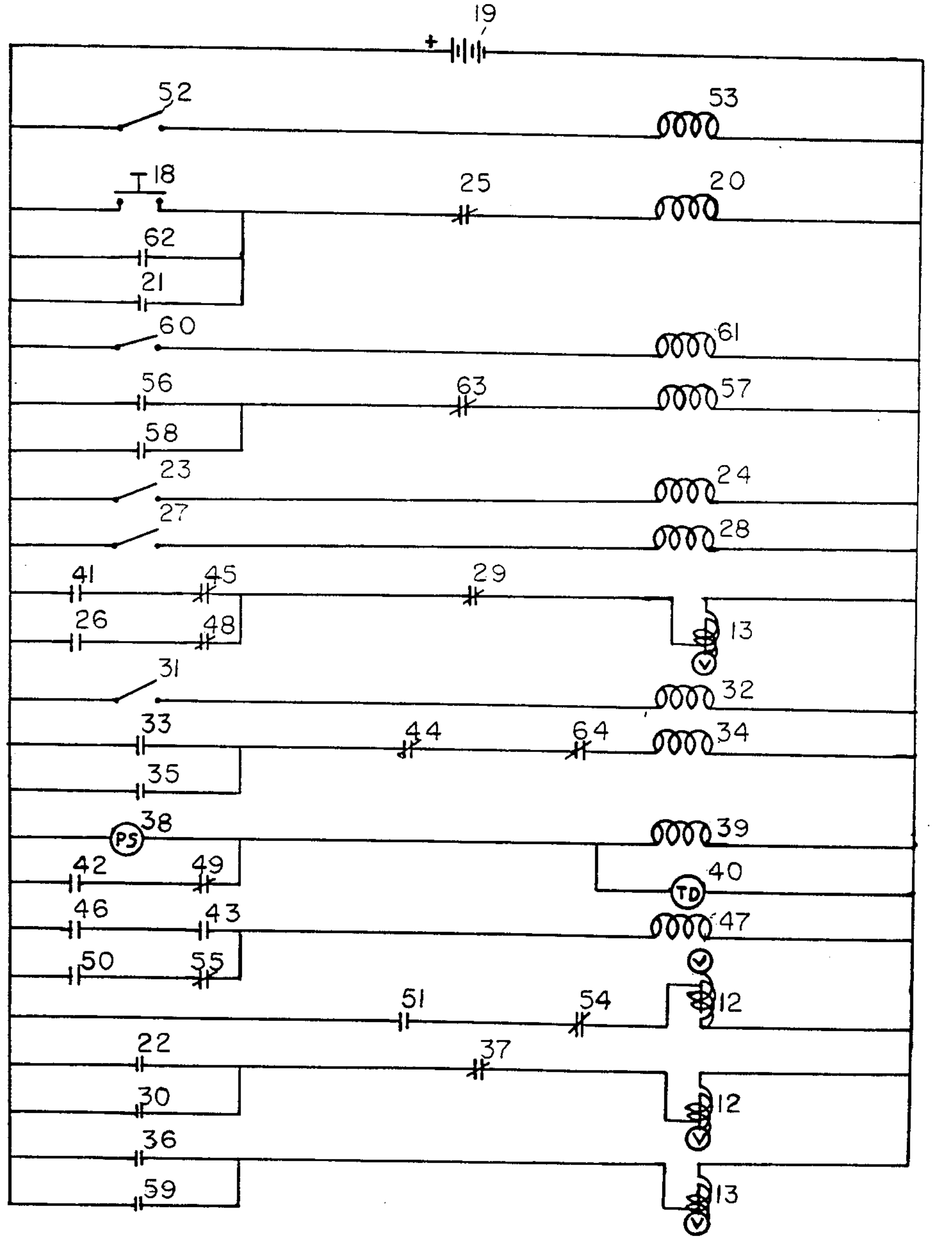
FIG. 12 is an electrical circuit diagram for automatic control of solenoid valves.

FIG. 12 is an electrical circuit diagram for automatic control of solenoid valves 12 and 13. Operation is initiated by pushing switch 18 to allow battery 19 voltage across coil in relay 20. Contacts 21 and 22 close, energizing relay 20 and supplying current to coil in solenoid 12, thereby forcing box section 3 to advance (FIG. 7) until trip switch 23 is closed. Current flows to the coil in relay 24 opening contact 25 and closing contact 26. Relay 20 is now deenergized and contacts 21 and 22 are at normal position. This stops current flow to the coil in solenoid valve 12, thence the movement of box section 3. Current is supplied through contact 26 to the coil in solenoid 13, forcing the press pad 5 to lower (retract) until trip switch 27 is engaged. Relay 28 is energized forcing contact 29 to open and contact 30 to close. This stops current flow to the coil in solenoid valve 13, thence movement of press pad 5. Current is supplied through contact 30 to the coil in solenoid 12, advancing the box section 3. See FIG. 8. When switch 31 is tripped relay 32 is energized, closing contact 33. This supplies current to relay 34 which closes contacts 35 and 36 and opens contact 37. Current through contact 35 energizes relay 34. Current passes through contact 36 to the coil in solenoid 13. The press pad 5 is now in the compression stroke. When a preselected pressure is reached the switch 38 is closed. See FIG. 9. Relay 39 and time-delay 40 are energized. Contacts 41, 42 and 43 are closed while contact 44 is opened. Current passes through contact 41 and to the coil in solenoid 13. The press pad 5 retracts until time-delay contact 45 is opened and contact 46 is closed. Time of retraction is adjustable to less than one second. This releases high developed forces within mechanism. Current passing through contact 46 energized relay 47 which opens contact 48 and 49 and closes contact 50 and 51. Current passes through contact 51 to energize the coil in solenoid 12. This forces the box section 3 to retract until trip switch 52 forces current to relay 53. This relay opens contacts 54 and 55 and closes contact 56. Opening contact 53 stops current to the coil in solenoid 12, thence movement of the box section. Current flows through contact 56 to relay 57 which closes contacts 58 and 59. Current through contact 59 reaches the coil in solenoid 13, raising the brick product above the mold cavity 4. Simultaneously, with the box section fully retracted, a new load of stock fills the cavity 10. See FIG. 10. When the press pad reaches the top of the mold cavity 4 trip switch 60 is activated, providing current to relay 61. This closes contact 62 and opens contacts 63 and 64. Current flows through contact 61 to the coil in relay 20 and the process continues. Cyclic operation, with minimal human intervention, is a primary embodiment of the invention.

I claim:

1. A hydraulic press comprising the combination of:

a frame including two pairs of opposed side members which form a mold cavity and a crown member above said side members, one pair of said opposed side members extending above said mold cavity with said crown member being fixedly supported to the tops of said one pair of opposed side members, a moveable box section perpendicular to and slidable over the tops of the other pair of said opposed side members, said box section to supply stock to said mold cavity and to form an upper bearing surface when positioned over mold cavity, means attached to said box section for moving said box section horizontally over said mold cavity ejecting a compressed shape formed in said mold cavity, a vertically moveable press pad within said mold cavity, means on said frame to lower said press pad while said mold cavity is filled from said box section, and to raise said press pad to compress said stock within said mold cavity between said press pad and said upper bearing surface.

2. The combination of claim 1 which includes means for synchronizing sequential movement of said box section and said press pad.

3. The combination of claim 2 in which said vertical movement of said press pad and said horizontal movement of said box section are provided by separate double-action pistons within pressure cylinders.

4. The combination of claim 3 in which the pressure to move said pistons is provided by hydraulic fluid.

5. The combination of claim 4 in which solenoid operated valves control the flow of said hydraulic fluid, and an electrical circuit consisting of relays, trip switches, a pressure switch, and a timmer control 5 said solenoid-operated valves.

* * * * *